United States Patent
Shigetomi

(10) Patent No.: US 9,041,947 B2
(45) Date of Patent: May 26, 2015

(54) DISPLAY APPARATUS, ELECTRONIC APPARATUS, AND IMAGE FORMING APPARATUS THAT HIDES NON-SPECIFIED IMAGES AT THE SAME HIERARCHICAL LEVEL AS A SPECIFIED IMAGE

(71) Applicant: KYOCERA Document Solutions Inc., Osaka-shi, Osaka (JP)

(72) Inventor: Masayuki Shigetomi, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/288,511

(22) Filed: May 28, 2014

(65) Prior Publication Data

US 2014/0355024 A1 Dec. 4, 2014

(30) Foreign Application Priority Data

May 30, 2013 (JP) .................................. 2013-113847

(51) Int. Cl.
*G06F 3/12* (2006.01)
*H04N 1/00* (2006.01)
*G06F 3/041* (2006.01)

(52) U.S. Cl.
CPC ....... *H04N 1/00469* (2013.01); *H04N 1/00392* (2013.01); *H04N 1/0044* (2013.01); *G06F 3/041* (2013.01); *H04N 2201/0094* (2013.01)

(58) Field of Classification Search
CPC .. G06F 3/0482; G06F 3/0488; G06F 3/04886
USPC ......... 358/1.15, 1.13; 345/173, 174; 715/764, 715/810, 853, 841, 854; 399/81
See application file for complete search history.

(56) References Cited

U.S. PATENT DOCUMENTS

| | | | | |
|---|---|---|---|---|
| 2001/0026290 A1* | 10/2001 | Machida et al. | ............... | 345/810 |
| 2008/0122798 A1* | 5/2008 | Koshiyama et al. | .......... | 345/173 |
| 2010/0169834 A1* | 7/2010 | Wakizaka et al. | ............. | 715/821 |
| 2011/0187675 A1* | 8/2011 | Nakai et al. | ................... | 345/174 |
| 2012/0154313 A1* | 6/2012 | Au et al. | ....................... | 345/173 |

FOREIGN PATENT DOCUMENTS

JP 2008-117371 5/2008
JP 2010-92219 4/2010

* cited by examiner

*Primary Examiner* — Jacky X Zheng
(74) *Attorney, Agent, or Firm* — Gerald E. Hespos; Michael J. Porco; Matthew T. Hespos

(57) ABSTRACT

A display apparatus includes a display section, a display control section, a distance detection section, and a coordinate detection section. The display section has a display area in which a selection image is displayed. When the selection image is formed by a plurality of images hierarchically associated with one another, the display control section displays consecutively the images configuring the selection image in accordance with the hierarchical association. The distance detection section detects a spatial distance between a pointer and the display area. The coordinate detection section detects coordinates which correspond to a position of the pointer. The display control section displays, together with a specified image displayed at a position corresponding to the coordinates detected by the coordinate detection section, related images in an immediately lower level in the hierarchy associated with the specified image, when the spatial distance detected is shorter than a preset threshold distance.

11 Claims, 8 Drawing Sheets

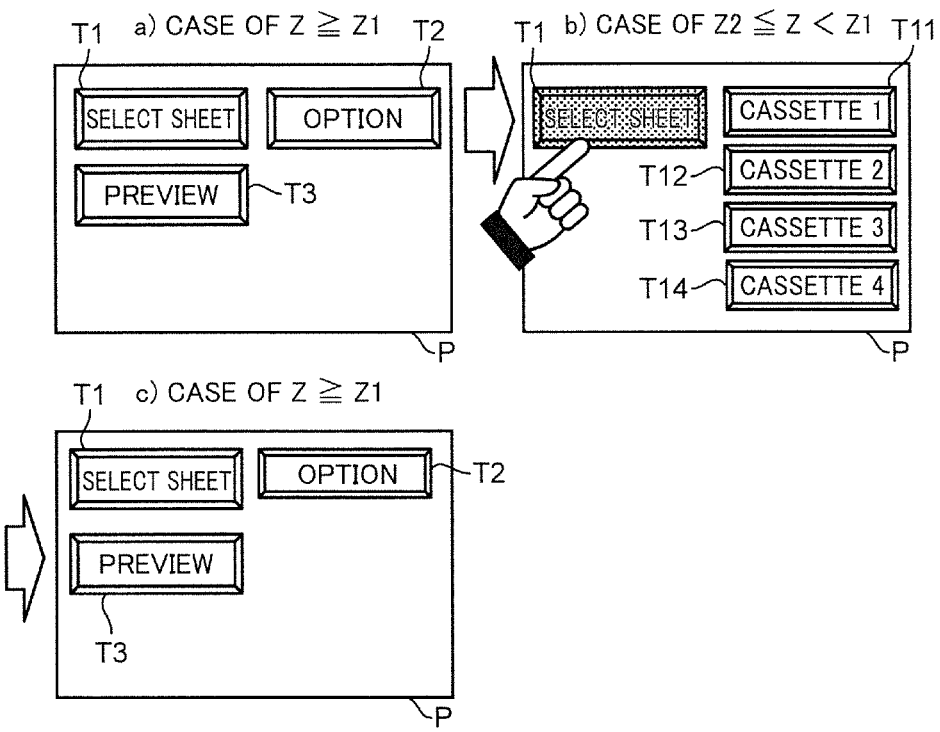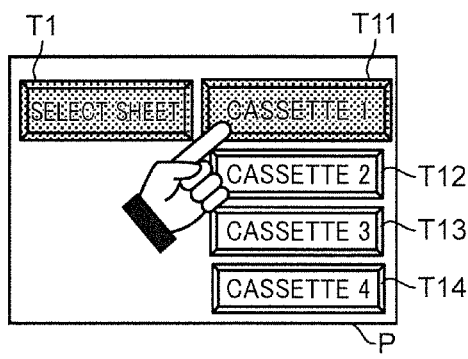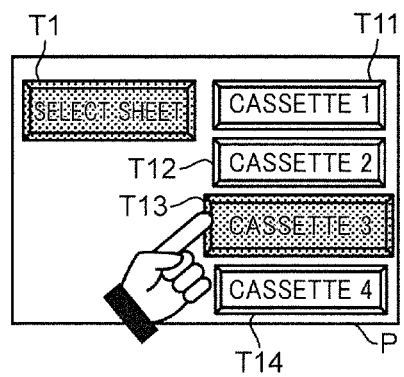

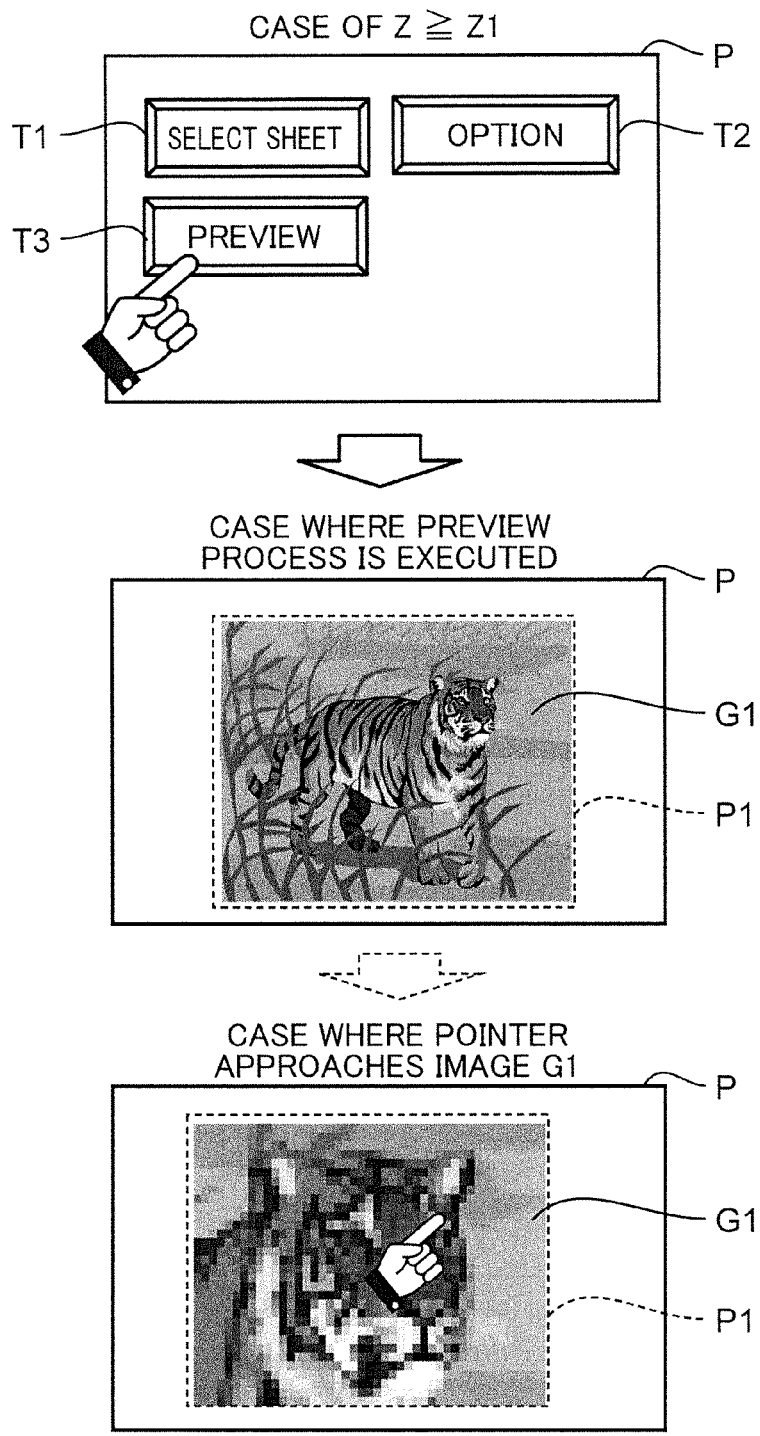

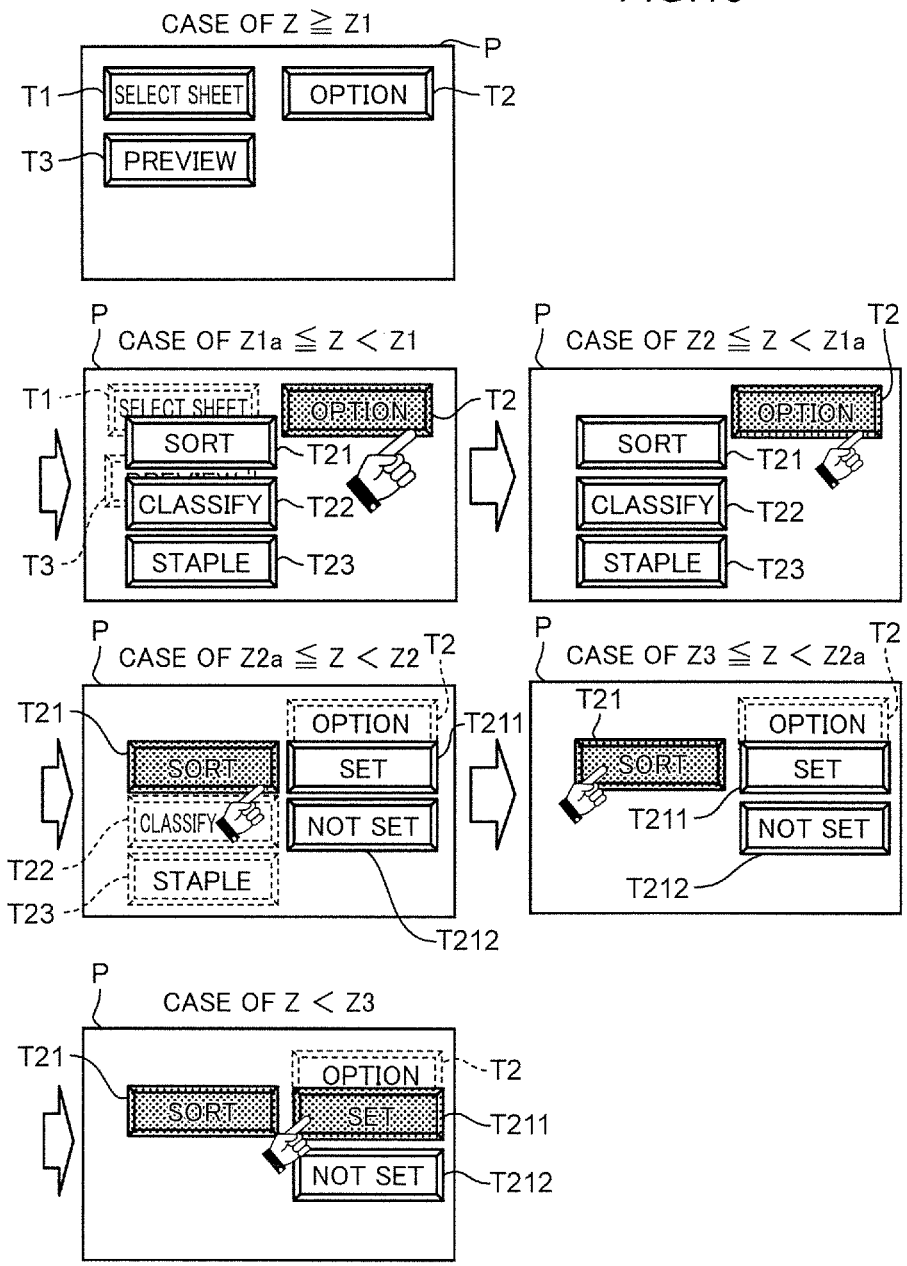

DISPLAY APPARATUS, ELECTRONIC APPARATUS, AND IMAGE FORMING APPARATUS THAT HIDES NON-SPECIFIED IMAGES AT THE SAME HIERARCHICAL LEVEL AS A SPECIFIED IMAGE

INCORPORATION BY REFERENCE

The application is based on Japanese Patent Application No. 2013-113847 filed to Japanese Patent Office on May 30, 2013, the contents of which are incorporated herein by reference.

BACKGROUND

The present disclosure relates to a display apparatus, an electronic apparatus, and an image forming apparatus, and in particular, to a technique allowing a user to make selection from a selection image formed by images hierarchically associated with one another.

An electronic apparatus with a display section having a touch panel function is conventionally known in which the display contents of the display section are changed in accordance with a distance between the display section and a pointer such as a finger or a pen which is used for touch operations.

For example, it is known to adjust a resolution used for detection of the position of the pointer in accordance with the distance between the display section and the pointer to change the display contents of the display section based on the detected position of the pointer and movement or trajectory of the pointer.

Furthermore, as is known, when the finger approaches a touch panel with a plurality of touch buttons displayed on the touch panel, coordinates corresponding to the position of the finger are detected to provide enlarged display of a touch button present at the position corresponding to the coordinates. Then, as is known, when the user touches the touch button displayed in an enlarged manner, a process associated with the touch button is executed.

However, a selection image (touch buttons) from which the user makes selection may include a plurality of images hierarchically associated with one another. In this case, as is conventionally known, when the user selects one of the images of the selection image, a process associated with the selected image is executed. For example, a process is executed which involves hiding images at the same hierarchical level as that to which the selected image belongs, while displaying images in an immediately-lower hierarchical level corresponding to the selected image. Then, to allow the user to select one of the displayed images at the immediately lower hierarchical level, a process is executed again which involves providing enlarged display of the displayed images at the immediately lower hierarchical level in accordance with the spatial distance between the pointer and a display area.

In other words, according to the conventional technique, when a selection image includes a plurality of images hierarchically associated with one another, it is impossible to simultaneously view a displayed image and images at a lower hierarchical level associated with the displayed image. Thus, the user may notice that an image selected from the images at the higher hierarchical level is erroneous when the images at the lower hierarchical level are displayed. In this case, the user needs to perform an operation of re-displaying the images at the higher hierarchical level and then again an operation of selecting one of the displayed images at the higher hierarchical level.

As described above, according to the conventional technique, when a selection image includes a plurality of images hierarchically associated with one another, the user may fail to efficiently make sequential selections in accordance with the hierarchical association.

An object of the present disclosure is to allow the user to perform more efficient operations when making selection from a selection image including a plurality of images hierarchically associated with one another.

SUMMARY

A display apparatus according to the present disclosure includes a display section, a display control section, a distance detection section, and a coordinate detection section. The display section has a display area in which a selection image from which a user makes selection in use of a pointer is displayed. When the selection image includes a plurality of images hierarchically associated with one another, the display control section displays the images configuring the selection image in the display area in accordance with the hierarchical association. The distance detection section detects a spatial distance between the pointer and the display area. The coordinate detection section detects coordinates in the display area which correspond to a position of the pointer. The display control section executes a multiple hierarchical-levels display process of displaying, in the display area, together with a specified image displayed at a position corresponding to the coordinates detected by the coordinate detection section, related images at an immediately lower hierarchical level associated with the specified image, when the spatial distance detected by the distance detection section is shorter than a preset threshold distance.

BRIEF DESCRIPTION OF THE DRAWINGS

FIG. 7 is a diagram showing an example of a change in the display contents in the display area made by a user moving the finger away;

FIG. 8 is a diagram showing an example of a change in the display contents in the display area resulting from a change in coordinates detected by a coordinate detection section;

FIG. 9 is a diagram showing an example of a change in the display contents in the display area resulting from a change in the coordinates detected by the coordinate detection section after execution of a preview process; and FIG. 10 is a diagram showing an example of a change in the display contents in the display area resulting from execution of the multiple hierarchical-levels display process and a transparent display process.

DETAILED DESCRIPTION

Figure 1:
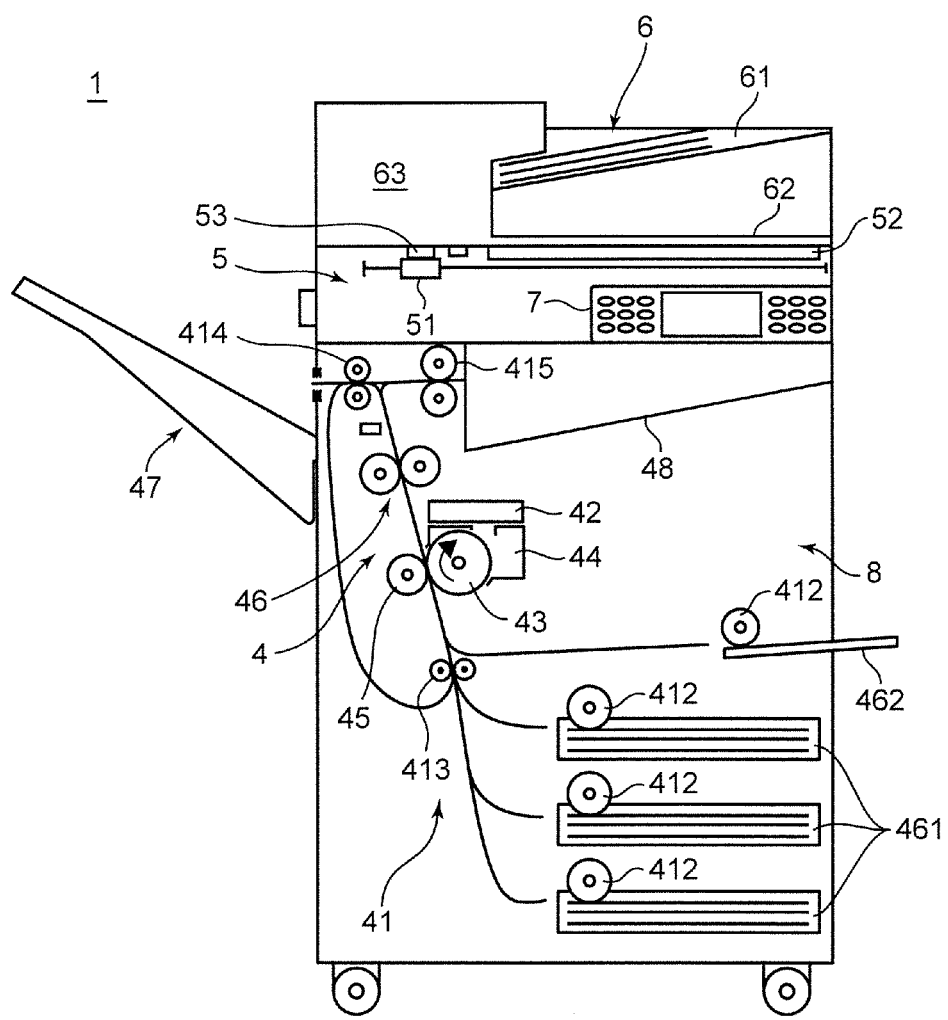
FIG. 1 is a diagram of a general structure of a multifunction printer according to an embodiment of an image forming apparatus according to the disclosure.
Figure 2:
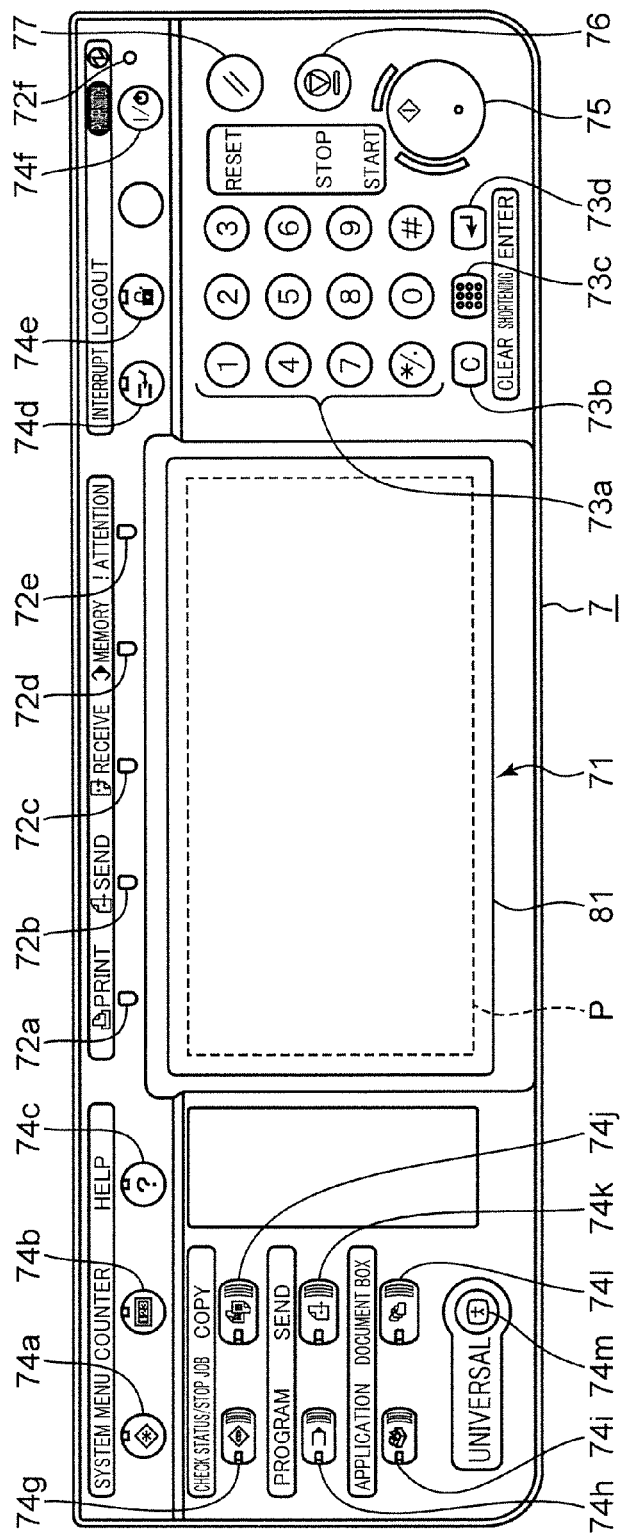
FIG. 2 is a diagram showing an example of an operation section.
Figure 3:
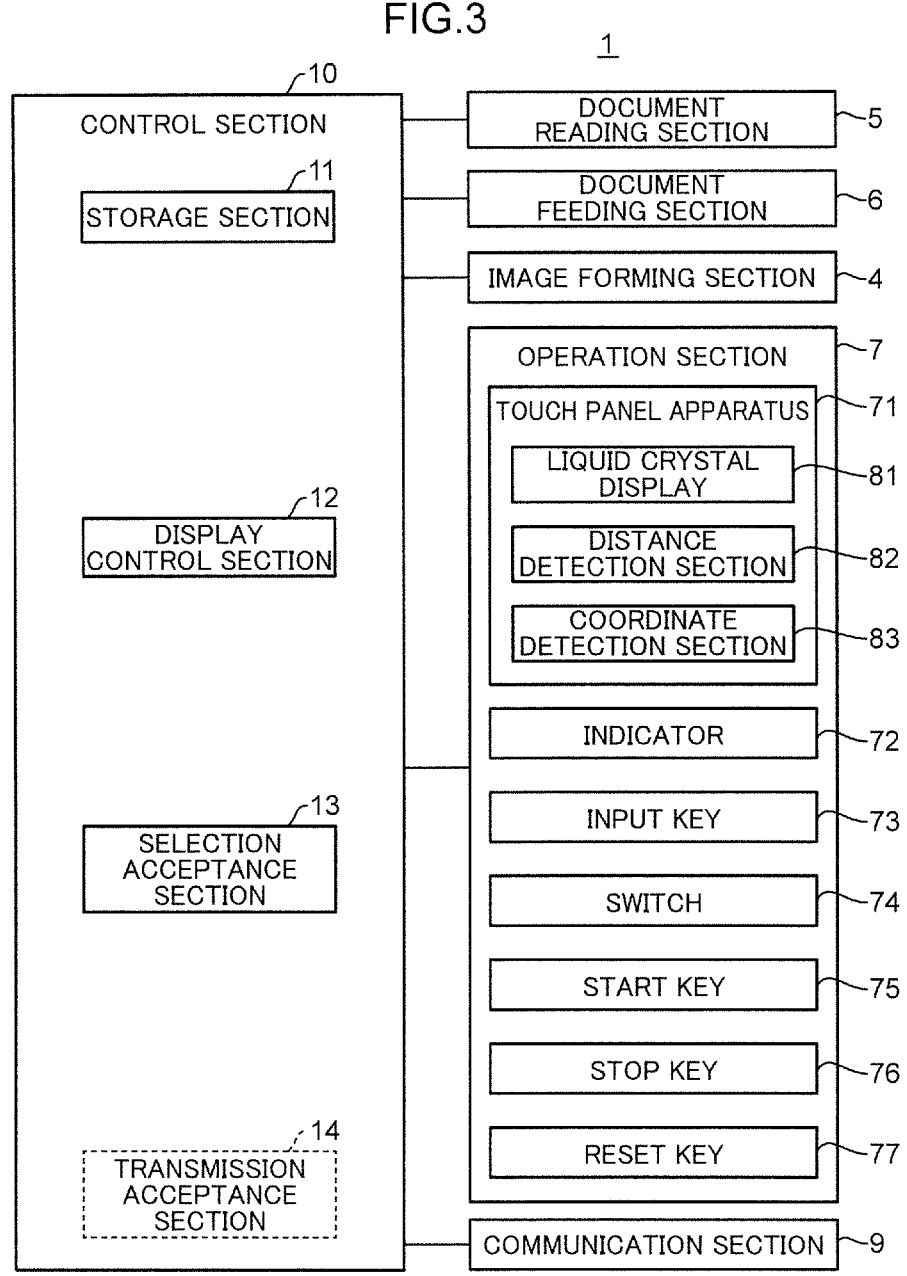
FIG. 3 is a block diagram showing an example of an electrical configuration of the multifunction printer.

An embodiment according to the disclosure will be described. In the present embodiment, a multifunction printer will be described by way of example as an image forming apparatus according to the disclosure. However, the disclosure is not limited to the multifunction printer. The image forming apparatus may be, for example, a copier, a printer apparatus, or a facsimile apparatus. FIG. 1 is a diagram of a general structure of a multifunction printer 1 according to an embodiment of an image forming apparatus according to the disclosure. FIG. 2 is a diagram showing an example of an operation section 7. FIG. 3 is a block diagram showing an example of an electrical configuration of the multifunction printer 1.

As shown in FIG. 1, the multifunction printer 1 includes a document reading section 5, a document feeding section 6, a main body section 8, and an operation section 7.

The document reading section 5 is disposed in an upper portion of the main body section 8. The document reading section 5 includes a scanner section 51 including an exposure lamp and a charge coupled device (CCD), a platen 52 formed of a transparent member such as glass, and a document reading slit 53.

The scanner section 51 is configured to be movable by a driving section (not shown in the drawings). When reading a document placed on the platen 52, the scanner section 51 moves along a document surface at a position opposite to the platen 52. The scanner section 51 scans a document image, while outputting resulting image data to a control section 10 described below. Furthermore, the scanner section 51 moves to a position opposite to the document reading slit 53 when reading a document fed by the document feeding section 6. Then, the scanner section 51 acquires an image of the document via the document reading slit 53 in synchronism with an operation of conveying the document performed by the document feeding section 6. The scanner section 51 then outputs resulting image data to the control section 10 described below.

The document feeding section 6 is disposed above the document reading section 5. The document feeding section 6 includes a document placement section 61 on which a document is placed, a document discharge section 62 for discharging a document from which an image has been read, and a document conveying mechanism 63. The document conveying mechanism 63 delivers one at a time a document placed on the document placement section 61 to a position opposite to the document reading slit 53. The document conveying mechanism 63 then discharges the document to the document discharge section 62.

The main body section 8 includes a plurality of sheet feeding cassettes 461, a manual feeding tray 462, a sheet feeding roller 412 which delivers one at a time a sheet from the sheet feeding cassette 461 or the manual feeding tray 462 and then conveys the sheet to an image forming section 4, the image forming section 4 that forms an image on the conveyed sheet, and a stack tray 47 and a discharge tray 48 to which the sheet with the image formed thereon is discharged.

The image forming section 4 includes a sheet conveying section 41, an optical scanning apparatus 42, a photosensitive drum 43, a developing section 44, a transfer section 45, and a fixation section 46.

The sheet conveying section 41 is provided in a sheet conveying path in the image forming section 4. The sheet conveying section 41 includes a conveying roller 413 that supplies a sheet conveyed by the sheet feeding roller 412 to the photosensitive drum 43, a conveying roller 414 that conveys the sheet to the stack tray 47, and a conveying roller 415 that conveys the sheet to the discharge tray 48.

The optical scanning apparatus 42 outputs laser light based on image data input to the control section 10 to expose the photosensitive drum 43. Thus, the optical scanning apparatus 42 forms an electrostatic latent image on the photosensitive drum 43.

The developing section 44 attaches toner to the electrostatic latent image on the photosensitive drum 43. Thus, the developing section 44 forms a toner image on the photosensitive drum 43. The transfer section 45 transfers the toner image on the photosensitive drum 43 to the sheet. The fixation section 46 heats the sheet with the toner image transferred thereto to fix the toner image to the sheet.

The operation section 7 is provided on a front surface portion of the multifunction printer 1 and configured to allow a user to input various operational instructions via the operation section 7. As shown in FIG. 2, the operation section 7 includes a touch panel apparatus 71, indicators 72a to 72f, input keys 73a to 73d, switches 74a to 74m, a start key 75, a stop key 76, and a reset key 77.

The touch panel apparatus 71 includes a liquid crystal display 81 (display section) with a display area P in which information is displayed. Furthermore, the touch panel apparatus 71 has a capacitive touch panel function. The touch panel apparatus 71 operates as a distance detection section 82 (FIG. 3) or a coordinate detection section 83 (FIG. 3). The touch panel apparatus 71 is not limited to the capacitive type but may have, for example, an ultrasonic touch panel function or an optical touch panel function. The distance detection section 82 uses the touch panel function to detect the spatial distance between a pointer such as the finger or a pen and the display area P based on a change in capacitance on the display area P made by the user moving the pointer on the display area. The coordinate detection section 83 detects coordinates on the display area P which correspond to the position of the pointer.

The indicators 72a to 72f include light emitting diodes. The indicators 72a to 72f are blinked or turned on and off to indicate the state of the multifunction printer 1. The input keys 73a to 73d are provided to input numbers and symbols and to erase or confirm an input character string.

The switches 74a to 74m are used to switch a function to be performed. For example, the switch 74j allows switching to a copy function to perform printing using image data read by the scanner section 51. When the switch 74j is depressed, a liquid crystal display 81 shows, in the display area P, a screen on which the user performs an operation of setting contents for the operation of the copy function.

The start key 75 is provided to start the operation of various functions. The stop key 76 is provided to stop the operation of the various functions. The reset key 77 is provided to recover the setting contents for the operation of the various functions to initial values.

Furthermore, as shown in FIG. 3, the following are connected together so as to communicate with one another: the document reading section 5, the document feeding section 6, the image forming section 4, the operation section 7, a communication section 9 described below, and the control section 10 described below.

The communication section 9 is connected to a telephone line to make facsimile communications to and from a facsimile apparatus connected to the telephone line. For example, the communication section 9 transmits image data read by the document reading section 5 to a facsimile apparatus via the telephone line and receives image data transmitted by a facsimile apparatus via the telephone line. Furthermore, the communication section 9 is connected to a network such as a local area network (LAN) to make data communications to and from an external apparatus such as a personal computer which is connected to the network. For example, the communication section 9 transmits image data read by the document reading section 5 to an external apparatus via the network and receives image data transmitted by an external apparatus via the network.

The control section 10 includes, for example, a central processing unit (CPU) that executes predetermined calculation processes, memories such as read only memory (ROM) in which predetermined control programs are stored and random access memory (RAM) in which data is temporarily stored, a storage medium such as an hard disk drive (HDD) in which various data such as image data is stored, and peripheral circuits for the CPU, the memories, and the storage medium. The control section 10 allows the CPU to execute control programs stored in ROM or the like to carry out various processes to control the operations of the sections in the multifunction printer 1.

In order to implement control so as to induce the user to execute setting operation, the control section 10 functions, in particular, as a storage section 11, a display control section 12, and a selection acceptance section 13.

The storage section 11 includes, for example, ROM. The storage section 11 stores selection images displayed in the display area P as images from which the user makes selection when performing a setting operation. The selection image includes a plurality of images hierarchically associated with one another.

Figure 4:
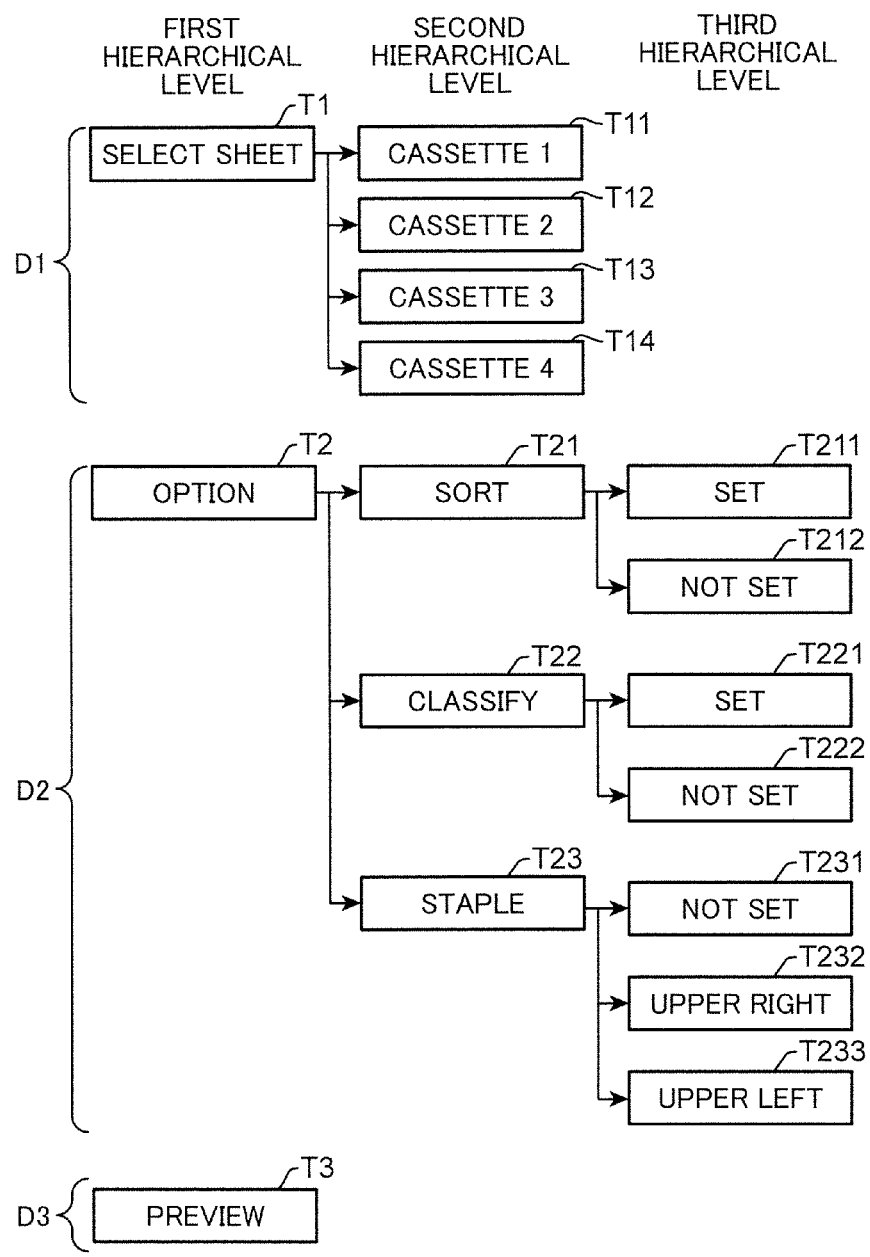
FIG. 4 is a diagram showing an example of a configuration of selection images.

FIG. 4 is a diagram showing an example of a configuration of selection images. As shown in FIG. 4, selection images D1 to D3 for a copy function are stored in the storage section 11.

The selection image D1 includes images T1 and T11 to T14 displayed in the display area P to allow the user to select a sheet for use in performing the copy function. The images T1 and T11 to T14 are associated with two hierarchies.

Specifically, the image T1 showing "SHEET SELECT" is associated with the first hierarchical level. The second hierarchical level lower than the hierarchical level of the image T1 is associated with the image T11 showing "CASSETTE 1", the image T12 showing "CASSETTE 2", the image T13 showing "CASSETTE 3", and the image T14 showing "CASSETTE 4".

In other words, after the image T1 at the first hierarchical level is displayed in the display area P, when the user selects the image T1, the images T11 to T14 associated with the image T1 are displayed. Thus, after selecting the image T1 at the first hierarchical level displayed in the display area P, the user performs an operation of selecting a desired one of the images T11 to T14 at the second hierarchical level—the lowest hierarchical level—associated with the selected image T1. As a result, the user can select a sheet housed in a sheet feeding cassette 461 or a manual feeding tray 462 that corresponds to the selected image as a sheet for use in performing the copy function.

The selection image D2 includes images T2, T21 to T23, and T211 to T233 displayed to allow the user to select an optional process for a sheet with an image printed thereon by performing the copy function. The images T2, T21 to T23, and T211 to T233 are associated with three hierarchies.

Specifically, the image T2 showing "OPTION" is associated with the first hierarchical level. The image T21 showing "SORT", the image T22 showing "CLASSIFY", and the image T23 showing "STAPLE" are associated with the second hierarchical level that is lower than the hierarchical level of the image T2. The image T211 showing "SET" and the image T212 showing "NOT SET" are associated with the third hierarchical level that is lower than the hierarchical level of the image T21. The image T221 showing "SET" and the image T222 showing "NOT SET" are associated with the third hierarchical level that is lower than the hierarchical level of the image T22. The image T231 showing "NOT SET", the image T232 showing "UPPER RIGHT", and the image T233 showing "UPPER LEFT" are associated with the third hierarchical level that is lower than the hierarchical level of the image T23.

In other words, after the image T2 in the second hierarchical level is displayed in the display area P, when the user selects the image T2, the images T21 to T23 associated with the image T2 are displayed. Moreover, when the user selects the image T21 from the displayed images T21 to T23, the images T211 and T212 associated with the image T21 are displayed. Similarly, when the user selects the image T22, the images T221 to T222 associated with the image T22 are displayed. When the user selects the image T23, the images T231 to T23 associated with the image T23 are displayed.

Thus, the after selecting the image T2 in the first hierarchical level displayed in the display area P, the user performs an operation of selecting a desired image from the images T21 to T23 in the second hierarchical level associated with the selected image T2. Thus, the user can select the optional function (the sort function, the classify function, or the staple function) corresponding to the image selected from the images T21 to T23. Moreover, the user selects those of the images T211, T212, T221, T222, and T231 to T233 in the lowest, third hierarchical level which are associated with the selected image. Thus, the user can select one of detailed settings (set, not set, upper right, and upper left) for the optional function (the sort function, the classify function, or the staple function) that corresponds to the image selected from the images T211, T212, T221, T222, and T231 to T233.

The selection image D3 includes an image T3 displayed in the display area P to allow the user to select an instruction to execute a preview process. The preview process is a process of allowing the document reading section 5 to read an image of a document to be formed on a sheet by the copy function and displaying the image read from the document in the display area P. Specifically, the image T3 showing "PREVIEW" is associated with the first hierarchical level.

Thus, when the user selects the image T3, the lowest image of the selection image D3 is selected. Thus, the user can select an instruction to execute the preview process associated with the selected image T3.

The storage section 11 is not limited to the specific examples, and stores selection images for allowing the user to select other setting contents for execution of the copy function and selection images for allowing the user to select other setting contents for execution of any other function of the multifunction printer 1.

The display control section 12 sequentially displays the images configuring the selection images D1 to D3 and hierarchically associated with one another, in the display area P, in accordance with the hierarchical association. The operation of displaying the images in the display area P performed by the display control section 12 will be described below in detail.

The selection acceptance section 13 accepts the user's selection of the images at the lowest hierarchical level included in the images configuring the selection images D1 to D3 when the images at the lowest hierarchical level are displayed in the display area P. The operation of accepting selection of the images at the lowest hierarchical level performed by the selection acceptance section 13 will be described below in detail.

With reference to FIGS. 5 to 10, description will be given which relates to the details of the operation of displaying each image in the display area P performed by the display control section 12 and the details of the operation of accepting selection of the images at the lowest hierarchical level performed by the selection acceptance section 13. In the description below, as a specific example, it is assumed that each of the images shown in FIG. 4 and providing the selection images D1 to D3 stored in the storage section 11 is displayed in the display area P.

First, a threshold distance will be described which is used by the display control section 12 to display each of the images in the display area P and which is used by the selection acceptance section 13 to accept selection of the images at the lowest hierarchical level.

Figure 5:
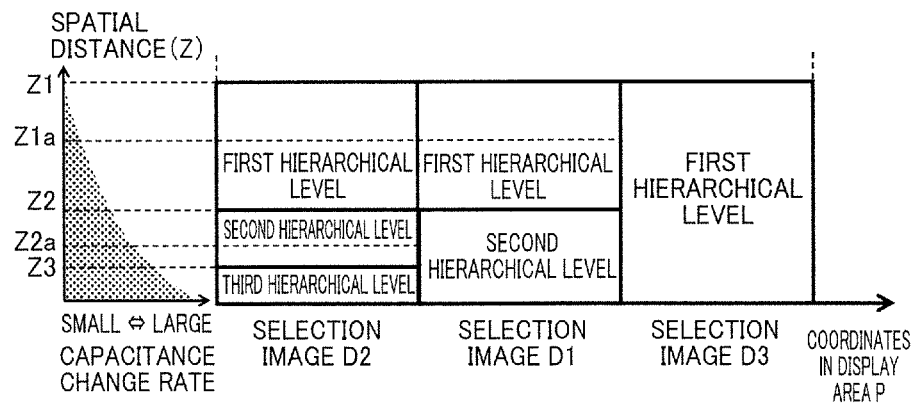
FIG. 5 is a diagram showing an example of relations between a threshold distance and hierarchies of images configuring a selection image.

FIG. 5 is a diagram showing an example of the relations between the threshold distance and the hierarchies of the images configuring each selection image. A graph in the left of FIG. 5 shows the relation between the magnitude of a change in capacitance on the display area P and a spatial distance Z between the display area P and a pointer such as the finger or a pen which is used by the user to select one of the images. The relations are preset based on experimental values obtained from trial operations or the like and stored in ROM or the like (not shown in the drawings) in the touch panel apparatus 71.

When the user moves the pointer, the coordinate detection section 83 (FIG. 3) detects a position corresponding to coordinates on the display area P where a change in capacitance is detected and outputs a detection signal indicative of the position corresponding to the detected coordinates to the control section 10.

The distance detection section 82 (FIG. 3) detects the magnitude of a change in capacitance occurring at a position corresponding to the coordinates on the display area P detected by the coordinate detection section 83. Based on the relations shown in the graph, the distance detection section 82 converts the detected magnitude of a change in capacitance into the spatial distance Z, and outputs a detection signal indicative of the spatial distance Z to the control section 10.

Furthermore, as shown in the right of FIG. 5, threshold distances Z1, Z2, and Z3 are preset in association with the hierarchies of the images configuring the selection images D1 to D3 displayed in the display area P. The threshold stances Z1, Z2, and Z3 are stored in ROM or the like in the control section 10.

For example, an initial spatial distance Z exhibiting a change in capacitance is preset as the threshold distance Z1 in association with the first hierarchical level to which the images T1 to T3 providing the selection images D1 to D3 belong. A spatial distance Z shorter than the threshold distance Z1 is preset as the threshold distance Z2 in association with the second hierarchical level to which the images T11 to T14 and T21 to T23 configuring the selection images D1 and D2 belong. A spatial distance Z shorter than the threshold distance Z2 is preset as the threshold distance Z3 in association with the third hierarchical level to which the images T211, T212, T221, T222, and T231 to T233 configuring the selection image D2 belong.

Moreover, in association with each of the hierarchies (higher hierarchies) which are different from the lowest hierarchical level and to which the images configuring the selection images D1 to D3 belong, sub-threshold distances Z1a and Z2a are set which are shorter than the threshold distance associated with the hierarchical level and longer than the threshold distance associated with the immediately lower hierarchical level. The sub-threshold distances Z1a and Z2a are stored in ROM or the like in the control section 10.

For example, for the hierarchies to which the images configuring the selection image D1 belong, the first hierarchical level is different from the lowest, second hierarchical level. Thus, the selection image D1 involves a spatial distance Z longer than the threshold distance Z2 associated with the second hierarchical level immediately below the first hierarchical level and shorter than the threshold distance Z1 associated with the first hierarchical level, set as the sub-threshold distance Z1a in association with the first hierarchical level.

Similarly, for the hierarchies to which the images configuring the selection image D2 belong, the first hierarchical level is different from the lowest, third hierarchical level. The selection image D2 involves a spatial distance Z longer than the threshold distance Z2 associated with the second hierarchical level immediately below the first hierarchical level and shorter than the threshold distance Z1 associated with the first hierarchical level, set as the sub-threshold distance Z1a in association with the first hierarchical level.

Furthermore, for the hierarchies to which the images configuring the selection image D2 belong, the second hierarchical level is also different from the lowest, third hierarchical level. Thus, the selection image D2 involves a spatial distance Z longer than the threshold distance Z3 associated with the third hierarchical level immediately below the second hierarchical level and shorter than the threshold distance Z2 associated with the second hierarchical level, set as the sub-threshold distance Z2a in association with the second hierarchical level.

The display control section 12 sequentially displays the images configuring the selection images D1 to D3 in the display area P based on the results of comparisons between the spatial distance Z detected by the distance detection section 82 and each of the threshold distances Z1 to Z3 and the sub-threshold distances Z1a and Z2a.

Specifically, the display control section 12 first displays the images T1, T2, and T3 in the highest, first hierarchies of the selection images D1 to D3, in the display area P. The display control section 12 then executes a multiple hierarchical-levels display process when the spatial distance Z detected by the distance detection section 82 is shorter than a corresponding one of the threshold distances Z1 to Z3. The multiple hierarchical-levels display process is a process of showing, in the display area P, together with a specified image displayed at a position corresponding to the coordinates detected by the coordinate detection section 83 (FIG. 3), related images at the immediately lower level in the hierarchy associated with the specified image.

In the multiple hierarchical-levels display process, the display control section 12 further executes a higher hierarchical-level hiding process. The higher hierarchical-level hiding process is a process of hiding non-specified images at the same hierarchical level as that to which the specified image belongs, the non-specified images being different from the specified image.

It is assumed that, when the images at the lowest hierarchical levels of the selection images D1 to D3 are displayed in the display area P at positions with the coordinates detected by the coordinate detection section 83, the spatial distance Z detected by the distance detection section 82 is made shorter than the threshold distance associated with the lowest hierarchical level. At this time, the selection acceptance section 13 accepts selection of the images at the lowest hierarchical level displayed at positions corresponding to the coordinates detected by the coordinate detection section 83.

Figure 6:
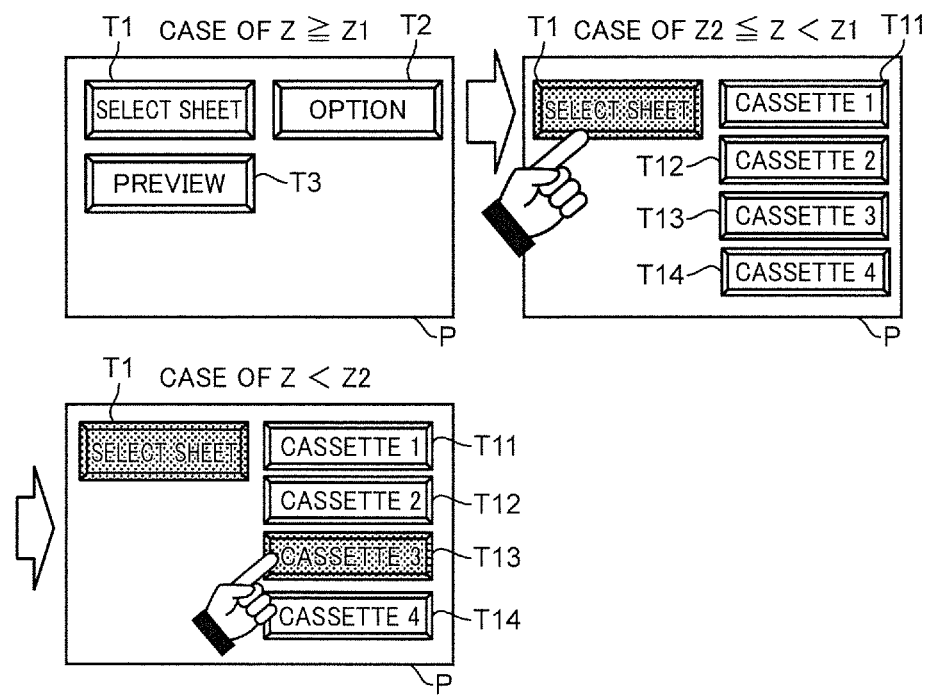
FIG. 6 is a diagram showing an example of a change in display contents in a display area resulting from execution of a multiple hierarchical-levels display process.

FIG. 6 is a diagram showing an example of a change in the display contents in the display area P resulting from execution of the multiple hierarchical-levels display process. For example, as shown in FIG. 6, the display control section 12 first displays the images T1, T2, and T3 in the highest, first hierarchies of the selection images D1 to D3, in the display area P ("CASE OF Z≥Z1" in FIG. 6).

When the user moves the pointer closer to the image T1 to make the spatial distance Z detected by the distance detection section 82 shorter than the threshold distance Z1 associated with the first hierarchical level, the display control section 12 executes the multiple hierarchical-levels display process.

In the multiple hierarchical-levels display process, the display control section 12 displays, in the display area P, the image T1 displayed at the position corresponding to the coordinates detected by the coordinate detection section 83 and the images T11 to T14 (FIG. 4) at the immediately lower hierarchical level—second hierarchical level associated with the image T1. That is, in this case, the image T1 is the specified image, and the images T11 to T14 are the related images. In the multiple hierarchical-levels display process, the display control section 12 further executes the higher hierarchical-level hiding process. In other words, the display control section 12 hides the images T2 and T3, which are at the first hierarchical level which is the same hierarchical level of the image T1 as the specified image, with the images T2 and T3 being non-specified images different from the specified image ("CASE OF Z2 ≤Z<Z1" in FIG. 6).

In this case, the images T11 to T14 displayed as related images by execution of the multiple hierarchical-levels display process are the images at the lowest hierarchical level of the selection image D1. It is further assumed that the user moves the pointer further closer to the image T13 so as to allow the image T13 to be displayed at the position corresponding to the coordinates detected by the coordinate detection section 83, making the spatial distance Z shorter than the threshold distance Z2 associated with the second hierarchical level to which the image T13 belongs. At this time, the selection acceptance section 13 accepts selection of the image T13 displayed at the position corresponding to the coordinates detected by the coordinate detection section 83 ("CASE OF Z<Z2" in FIG. 2).

In other words, according to the present embodiment, when the spatial distance Z detected by the distance detection section 82 is shorter than the threshold distance Z1, the related images T11 to T14 at the immediately lower level in the hierarchy associated with the image T1 are displayed along with the image T1. Thus, upon moving the pointer closer to the specified image T1, the user can simultaneously view the specified image T1 and the related images T11 to T14. This allows the user to understand the contents of the images T1 to T4 at the immediately lower level in the hierarchy associated with the specified image T1 before selecting the specified image T1.

As a result, the time and effort needed for the conventional technique is reduced. That is, according to the conventional technique, after erroneously selecting one of the images at the first hierarchical level, the user fails to notice the error until the images at the immediately lower level—at second hierarchical level associated with the erroneously selected image—are displayed. The user then needs to allow the images in the first hierarchical level to be displaced again to re-select one of the images. Thus, the present embodiment allows the user to perform more efficient operations when selecting the selection image D1 including the plurality of images hierarchically associated with one another.

Furthermore, according to the present embodiment, if the images T11 to T14 at the lowest, second hierarchical level of the selection image D1 are displayed, with the image T13 displayed at the position corresponding to the coordinates detected by the coordinate detection section 83, selection of the image T13 is accepted when the spatial distance Z is shorter than the threshold distance Z2 associated with the second hierarchical level.

Thus, the user can allow the multifunction printer 1 to accept selection of the image T13 at the second hierarchical level, that is, the lowest hierarchical level of the selection image D1 displayed in the display area P upon moving the pointer closer to the image T13 at the lowest hierarchical level so as to make the spatial distance Z shorter than the threshold distance Z2 associated with the second hierarchical level.

In other words, when the related images displayed as a result of execution of the multiple hierarchical-levels display process are those of the images configuring the selection image at the lowest hierarchical level, the user can simultaneously view the related images and the image at the immediately upper level in the hierarchy associated with the related images, which is the specified image used for the execution of the multiple hierarchical-levels display process. Thus, the user can quickly allow the multifunction printer 1 to accept the intended selection of the related images without the need to allow the multifunction printer 1 to accept selection of the specified image.

The configurations and the like shown in FIGS. 1 to 6 are only illustrative of the embodiment according to the disclosure and are not intended to limit the disclosure to the embodiment. For example, the display control section 12 may be simplified so as not to perform the higher hierarchical-level hiding process in the multiple hierarchical-levels display process.

(1) When the spatial distance Z is equal to or longer than the threshold distance associated with the hierarchical level immediately above the hierarchical level of the related images displayed as a result of execution of the multiple hierarchical-levels display process, the display control section 12 may hide the related images, while displaying, in the display area P, all of those of the images configuring the selection images at the hierarchical level immediately above the hierarchical level of the related images.

FIG. 7 is a diagram showing an example of a change in display contents in the display area P made by the user moving the finger away. For example, as shown in FIG. 7, the display control section 12 first displays, in the display area P, the images T1, T2, and T3 in the highest, first hierarchies of the selection images D1 to D3 as described above ("a) CASE OF Z≥Z1" in FIG. 7).

Then, when the user moves the pointer closer to the image T1 to make the spatial distance Z shorter than the threshold distance Z1 associated with the first hierarchical level, the display control section 12 executes the multiple hierarchical-levels display process as described above. As a result, the image T1 as a specified image and the images T11 to T14 as related images are displayed in the display area P ("b) CASE OF Z2 ≤Z<Z1" in FIG. 7).

Now, it is assumed that the user views the images T11 to T14 as related images, notices that the user has been erroneously attempting to select the image T1, and moves the pointer away from the image T1. It is further assumed that the movement makes the spatial distance Z equal to or longer than the threshold distance Z1 associated with the first hierarchical level immediately above the second hierarchical level to which the related images T11 to T14 belong. At this time, the display control section 12 may hide the related images T11 to T14. The display control section 12 may then display, in the display area P, all of the images T1 to T3 which are included in the images configuring the selection images D1 to D3 and which belong to the first hierarchical level immediately above the second hierarchical level to which the related images T11 to T14 belong ("c) CASE OF $Z \geq Z1$" in FIG. 7).

In other words, according to the present variation, when the spatial distance Z is equal to or longer than the threshold distance Z1 associated with the first hierarchical level immediately above the hierarchical level of the related images T11 to T14 displayed as a result of execution of the multiple hierarchical-levels display process, the display control section 12 may hide the related images T11 to T14. Moreover, the display control section 12 displays, in the display area P, all of those T1 to T3 of the images configuring the selection images D1 to D3 which belong to the first hierarchical level immediately above the hierarchical level of the related images T11 to T14.

Thus, upon moving the pointer closer to unintended erroneous image at the first hierarchical level so as to select the erroneous image, the user can view the images at the second hierarchical level immediately below the hierarchical level of the unintended erroneous image. This allows the user to notice that the user is attempting to select the erroneous image at the higher hierarchical level, first hierarchical level. In this case, by performing the easy operation of moving the pointer away from the display area P, the user can implement by means of the display control section 12 display of all of the images T1 to T3 at the first hierarchical level, included in the images configuring the selection images D1 to D3, the erroneous image also belonging to the first hierarchical level. As a result, the user can select one of the images at the higher hierarchical level, first hierarchical level again. Thus, the present variation allows the user to perform more efficient operations when re-selecting one of the selection images.

(2) Moreover, the display control section 12 may provide enlarged display of the image shown at the position corresponding to the coordinates detected by the coordinate detection section 83.

FIG. 8 is a diagram showing an example of a change in the display contents in the display area P resulting from a change in the coordinates detected by the coordinate detection section 83. For example, it is assumed that, when the image T1 and the images T11 to T14 are displayed in the display area P as shown in FIG. 8, the user moves the pointer onto the image T11. It is further assumed that the movement allows the image T11 to be displayed at the position corresponding to the coordinates detected by the coordinate detection section 83. At this time, the display control section 12 may provide enlarged display of the image T11 shown at the position corresponding to the coordinates detected by the coordinate detection section 83.

Similarly, it is assumed that the user moves the pointer onto the image T13 so as to allow the image T13 to be displayed at the position corresponding to the coordinates detected by the coordinate detection section 83. At this time, the display control section 12 may provide enlarged display of the image T13 shown at the position corresponding to the coordinates detected by the coordinate detection section 83.

In other words, since the present variation provides enlarged display of the image shown at the position corresponding to the coordinates detected by the coordinate detection section 83, this allows the user to easily understand the contents of the image to be selected.

That is, in the embodiment, the display apparatus according to the disclosure includes the touch panel apparatus 71 (the liquid crystal display 81, the distance detection section 82, and the coordinate detection section 83), and the control section 10 (the storage section 11, the display control section 12, and the selection acceptance section 13).

(3) Furthermore, the display control section 12 may execute the preview process and provide enlarged display of a part of an image of the document displayed as a result of execution of the preview process, with this part being displayed at the position corresponding to the coordinates detected by the coordinate detection section 83 so that an enlargement factor for the enlarged display depends on the spatial distance Z.

FIG. 9 is a diagram showing an example of a change in the display contents in the display area P resulting from a change in the coordinates detected by the coordinate detection section 83 after execution of the preview process. For example, it is assumed that the images T1 to T3 at the first hierarchical level, included in the images configuring the selection images D1 to D3, are displayed in the display area P as shown in FIG. 9 ("CASE OF $Z \geq Z1$" in FIG. 9).

It is further assumed that the user moves the pointer closer to the image T3 at the lowest hierarchical level of the selection image D3. The movement allows the image T3 to be displayed at the position corresponding to the coordinates detected by the coordinate detection section 83. This makes the spatial distance Z shorter than the threshold distance Z1 associated with the first hierarchical level to which the image T3 belongs. At this time, the selection acceptance section 13 accepts selection of the image T3 displayed at the position corresponding to the coordinates detected by the coordinate detection section 83. That is, the selection acceptance section 13 accepts selection of an instruction to execute the preview process corresponding to the image T3.

When the selection acceptance section 13 accepts the selection of the instruction to execute the preview process, the display control section 12 executes the preview process. That is, the display control section 12 allows the document reading section 5 to read an image from the document and displays the read image G1 of the document in an image display area P1 of the display area P ("CASE WHERE PREVIEW PROCESS IS EXECUTED" in FIG. 9).

It is assumed that the user then moves the pointer closer to an upper right portion of the image G1 displayed in the image display area P1. At this time, the display control section 12 may enlarge the image G1 around the position corresponding to the coordinates detected by the coordinate detection section 83 to display only the range in the enlarged image G1 which corresponds to the image display area P1 ("CASE WHERE POINTER APPROACHES IMAGE G1" in FIG. 9). For example, in providing enlarged display of the image G1, the display control section 12 increases the enlargement factor with decreasing spatial distance Z, while reducing the enlargement factor with increasing spatial distance Z.

In other words, the present variation provides enlarged display of a part of the image G1 of the document read by the document reading section 5 which part is displayed at the position corresponding to the coordinates detected by the coordinate detection section 83 so that the enlargement factor for the enlarged display depends on the spatial distance Z between the pointer and the display area P. Thus, by performing the easy operation of moving the pointer closer to or away from the display area P, the user can change the enlargement factor for the part displayed at the position corresponding to the coordinates detected by the coordinate detection section 83. Consequently, the user can appropriately understand the contents of the image G1 of the document.

That is, in the present variation, the display apparatus according to the disclosure includes the document reading section 5, the touch panel apparatus 71 (the liquid crystal display 81, the distance detection section 82, and the coordinate detection section 83), and the control section 10 (the storage section 11, the display control section 12, and the selection acceptance section 13).

(4) Furthermore, the display control section 12 may further execute a transparent display process during the multiple hierarchical-levels display process when the specified image is an image at one of the hierarchical levels (higher hierarchies) to which the images configuring the selection images D1 to D3 belong and which are different from the lowest hierarchical level. The transparent display process involves providing transparent display, in the display area P, of non-specified images in the one of the higher hierarchies which are different from the specified image while the spatial distance Z is equal to or longer than a sub-threshold distance associated with the one of the hierarchical levels and hiding the non-specified images when the spatial distance Z is shorter than the sub-threshold distance associated with the one of the hierarchical levels.

Accordingly, when multiple hierarchical-levels display processes are consecutively executed, the display control section 12 may execute a specified image transmission process of providing transparent display of the specified image in an already executed multiple hierarchical-levels display process.

FIG. 10 is a diagram showing an example of a change in the display contents in the display area P resulting from execution of the multiple hierarchical-levels display process and the transparent display process. For example, as shown in FIG. 10, the display control section 12 first displays the images T1, T2, and T3 in the highest, first hierarchies of the selection images D1 to D3 in the display area P as described above ("CASE OF Z≥Z1" in FIG. 10).

It is assumed that the user moves the pointer closer to the image T2 to change the specified image to the image T2, making the spatial distance Z shorter than the threshold distance Z1 associated with the first hierarchical level to which the image T2 belongs. At this time, the display control section 12 executes the multiple hierarchical-levels display process. As a result, along with the image T2 as the specified image, the images T21 to T23 at the immediately lower level in the hierarchy associated with the image T2 are displayed in the display area P as the related images.

Furthermore, the image T2 as the specified image is one of the images configuring the selection image D2 at the first hierarchical level of the selection image D2 which is different from the lowest hierarchical level. Thus, the display control section 12 may execute a transparent display process during the multiple hierarchical-levels display process.

In the transparent display process, the display control section 12 implements transparent display, in the display area P, of the non-specified images T1 and T3, which are different from the specified image T2 and which are at the first hierarchical level to which the specified image T2 also belongs, while the spatial distance Z is equal to or longer than the sub-threshold distance Z1a associated with the first hierarchical level to which the specified image T2 belongs ("CASE OF Z1a≤Z<Z1" in FIG. 10).

It is assumed that the user moves the pointer further closer to the display area P to make the spatial distance Z shorter than the sub-threshold distance Z1 a associated with the hierarchical level of the specified image T2. At this time, the display control section 12 hides the non-specified images T1 and T3, which are different from the specified image T2 and which are at the first hierarchical level to which the specified image T2 also belongs ("CASE OF Z2 ≤Z<Z1a" in FIG. 10).

It is assumed that the user moves the pointer closer to the image T21 to change the specified image to the image T21, making the spatial distance Z detected by the distance detection section 82 shorter than the threshold distance Z2 associated with the second hierarchical level to which the image T21 belongs. At this time, the display control section 12 executes the multiple hierarchical-levels display process. As a result, along with the image T21 as the specified image, the images T211 and T212 at the immediately lower level at the hierarchical level associated with the image T21 are displayed in the display area P as the related images.

Additionally, when multiple hierarchical-levels display processes are consecutively executed as described above, the display control section 12 may execute a specified image transmission process of providing transparent display of the specified image T2 in an already executed multiple hierarchical-levels display process.

Furthermore, the image T21 as the specified image is one of the images configuring the selection image D2 that is at the second hierarchical level of the selection image D2 which is different from the lowest hierarchical level. Thus, the display control section 12 also executes the transparent display process during the multiple hierarchical-levels display process.

In other words, in the transparent display process the display control section 12 implements transparent display, in the display area P, of the non-specified images T22 and T23, which are different from the specified image T21 and which are at the second hierarchical level to which the specified image T21 also belongs, while the spatial distance Z is equal to or longer than the sub-threshold distance Z2a associated with the second hierarchical level to which the specified image T21 belongs ("CASE OF Z2a≤Z<Z2" in FIG. 10).

It is assumed that the user moves the pointer further closer to the display area P to make the spatial distance Z shorter than the sub-threshold distance Z2a associated with the hierarchical level of the specified image T21. At this time, the display control section 12 hides the non-specified images T22 and T23, which are different from the specified image T21 and which is at the same hierarchical level to which the specified image T21 also belongs ("CASE OF Z3≤Z<Z2a" in FIG. 10).

In other words, the images T211 and T212 as related images displayed as a result of execution of the multiple hierarchical-levels display process belong to the lowest, third hierarchical level of the selection image D2. It is assumed that the user then moves the pointer further closer to the image T211 so as to allow the image T211 to be displayed at the position corresponding to the coordinates detected by the coordinate detection section 83, making the spatial distance Z shorter than the threshold distance Z3 associated with the third hierarchical level to which the image T211 belongs. At this time, the selection acceptance section 13 accepts selection of the image T211 displayed at the position corresponding to the coordinates detected by the coordinate detection section 83 ("CASE OF Z<Z3" in FIG. 10).

In other words, during the multiple hierarchical-levels display process, when the specified image T2 (T21) is an image at one of the hierarchical levels of the images configuring the selection image D2 that is different from the lowest hierarchical level, in the display area P transparent display of the non-specified images T1 and T3 (T22 and T23) is implemented, which are at the same hierarchical level to which the specified image T2 belongs and which are different from the specified image T2 (T21), while the spatial distance Z is equal to or longer than the sub-threshold distance Z1a (Z2a) associated with the one of the hierarchical levels, according to the present variation. Subsequently, when the spatial distance Z is shorter than the sub-threshold distance Z1a (Z2a) associated with the one of the hierarchical levels to which the specified image T2 belongs, the non-specified images T1 and T3 (T22 and T23) are hidden.

Thus, upon moving the pointer closer to the specified image T2 (T21), the user can simultaneously view not only the specified image T2 (T21) and related images T21 to T23 (T211 and T212) displayed as a result of execution of the multiple hierarchical-levels display process but also the non-specified images T1 and T3 (T22 and T23) transparently displayed when the pointer is moved further closer to the specified image T2 (T21) during the initial execution of the multiple hierarchical-levels display process. Thus, the user can easily determine whether the specified image T2 (T21) and the related images T21 to T23 (T211 and T212) associated with the specified image T2 (T21) have been erroneously selected.

In the present variation, the display control section 12 may omit the specified image transmission process. Accordingly, the display control section 12 may display the image T2 or T21 corresponding to the specified image in each multiple hierarchical-levels display process, behind an image at a lower hierarchical level than the image T2 or T21 without making the image T2 or T21 transparent, or may hide the image T2 or T21 corresponding to the specified image.

That is, in the present variation, the display apparatus according to the disclosure includes the touch panel apparatus 71 (the liquid crystal display 81, the distance detection section 82, and the coordinate detection section 83), and the control section 10 (the storage section 11, the display control section 12, and the selection acceptance section 13).

(5) Furthermore, as shown by a dashed portion in FIG. 3, the control section 10 may be allowed to further function as a transmission acceptance section 14 that accepts the user's selection of whether or not to allow the display control section 12 to execute the transparent display process described for the variation in (4).

Specifically, the transmission acceptance section 14 displays, in the display area P, a selection image including two images at one hierarchical level indicating that the display control section 12 is or is not allowed to execute the transparent display process. It is assumed that, when one of the two images is displayed at the position corresponding to the coordinates detected by the coordinate detection section 83, the spatial distance Z is made shorter than the threshold distance Z1 associated with the hierarchical level of the displayed image. At this time, the transmission acceptance section 14 accepts selection of the image displayed at the position corresponding to the coordinates detected by the coordinate detection section 83.

When the transmission acceptance section 14 accepts the selection of the image indicating that the display control section 12 is allowed to execute the transparent display process, the display control section 12 executes the transparent display process. On the other hand, when the transmission acceptance section 14 accepts the selection of the image indicating that the display control section 12 is not allowed to execute the transparent display process, the display control section 12 does not execute the transparent display process.

The present variation enables the user to select whether or not to allow the display control section 12 to execute the transparent display process. Thus, when the transparent display process is executed to transparently display the non-specified images and the user feels that the display contents in the display area P are cluttered and difficult to view, the user can appropriately switch the display contents in the display area P by, for example, selectively preventing the display control section 12 from executing the transparent display process.

That is, in the present variation, the display apparatus according to the disclosure includes the touch panel apparatus 71 (the liquid crystal display 81, the distance detection section 82, and the coordinate detection section 83), and the control section 10 (the storage section 11, the display control section 12, the selection acceptance section 13, and the transmission acceptance section 14).

The display apparatus according to the disclosure is not limited to an image forming apparatus having a main body section such as the multifunction printer 1. The display apparatus according to the disclosure is applicable to an electronic apparatus having a main body section such as a scanner apparatus, a personal computer, a cellular phone, a microwave oven, a washing machine, a car navigation apparatus, or a game machine.

The disclosure as described above allows the user to perform more efficient operations when making selection from a selection image including a plurality of images hierarchically associated with one another.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

What is claimed is:

1. A display apparatus comprising:
   a display section having a display area in which a selection image from which a user makes selection in use of a pointer is displayed;
   a display control section consecutively displaying, when the selection image is formed by a plurality of images hierarchically associated with one another, the images configuring the selection image in the display area in accordance with the hierarchical association;
   a distance detection section detecting a spatial distance between the pointer and the display area; and
   a coordinate detection section detecting coordinates in the display area which correspond to a position of the pointer, wherein the display control section executes a multiple hierarchical-levels display process of displaying, in the display area, together with a specified image displayed at a position corresponding to the coordinates detected by the coordinate detection section, related images at an immediately lower level in the hierarchy associated with the specified image, when the spatial distance detected by the distance detection section is shorter than a preset threshold distance, the display control section further executes a higher hierarchical-global hiding process for hiding non-specified images at the same hierarchical level as that to which the specified image belongs, the non-specified images being different from the specified images in multiple hierarchical-levels display process,
   the threshold distance is associated with each of the hierarchical levels of the images configuring the selection image so that the threshold distance becomes shorter as the hierarchical level is lowered,
   the display apparatus further comprising a selection acceptance section accepting an image at the lowest hierarchical level of the selection image displayed at the position corresponding to coordinates detected by the coordinate detection section when the spatial distance detected by the distance detection section is shorter than the threshold distance associated with the lowest hierarchical level in a case where the image at the lowest hierarchical level of the selection image is displayed by the display control section in the display area and at the position corresponding to the coordinates detected by the coordinate detection section, and when the spatial distance detected by the distance detection section is equal to or longer than the threshold distance associated with a hierarchical level immediately above the hierarchical level of the related images displayed as a result of execution of the multiple hierarchical-levels display process, the display control section hides the related images and displays, in the display area, all of images that are included in the images configuring the selection image and that are at the hierarchical level immediately above the hierarchical level of the related images.

2. The display apparatus according to claim 1, wherein the display control section implements enlarged display of the image displayed at the position corresponding to the coordinates detected by the coordinate detection section.

3. The display apparatus according to claim 1, further comprising a document reading section reading an image of a document, wherein the display control section executes a preview process of displaying, in the display area, the image of the document read by the document reading section, and provides enlarged display of a part of the image of the document displayed as a result of execution of the preview process, with this part being displayed at the position corresponding to the coordinates detected by the coordinate detection section so that an enlargement factor for the enlarged display depends on the spatial distance detected by the distance detection section.

4. The display apparatus according to claim 1, wherein the threshold distance is associated with each of the hierarchical levels of the images configuring the selection image so that the threshold distance becomes shorter as the hierarchical level is lowered, higher hierarchical levels of the images configuring the selection image, which are different from the lowest hierarchical level, are each associated with a sub-threshold distance longer than the threshold distance associated with a hierarchical level immediately lower than the higher hierarchical level and shorter than the threshold distance associated with the higher hierarchical level, and during the multiple hierarchical-levels display process, when the specified image is an image in one of the higher hierarchical levels, the display control section further executes a transparent display process of transparently displaying, in the display area, non-specified images which belong to the same hierarchical level as the one of the higher hierarchical levels and which are different from the specified image while the spatial distance detected by the distance detection section is equal to or longer than the sub-threshold distance associated with the one of the higher hierarchical levels, and hiding the non-specified images when the spatial distance detected by the distance detection section is shorter than the sub-threshold distance associated with the one of the higher hierarchical levels.

5. The display apparatus according to claim 4, further comprising a transmission acceptance section accepting selection of whether or not to allow the display control section to execute the transparent display process.

6. An electronic apparatus comprising:
a main body section of the electronic apparatus; and
the display apparatus according to claim 1.

7. An image forming apparatus comprising:
a main body section of the image forming apparatus; and
the display apparatus according to claim 1.

8. A display apparatus comprising:
a display section having a display area in which a selection image from which a user makes selection in use of a pointer is displayed;
a display control section consecutively displaying, when the selection image is formed by a plurality of images hierarchically associated with one another, the images configuring the selection image in the display area in accordance with the hierarchical association;
a distance detection section detecting a spatial distance between the pointer and the display area; and
a coordinate detection section detecting coordinates in the display area which correspond to a position of the pointer, wherein the display control section executes a multiple hierarchical-levels display process of displaying, in the display area, together with a specified image displayed at a position corresponding to the coordinates detected by the coordinate detection section, related images at an immediately lower level in the hierarchy associated with the specified image, when the spatial distance detected by the distance detection section is shorter than a preset threshold distance, the threshold distance is associated with each of the hierarchical levels of the images configuring the selection image so that the threshold distance becomes shorter as the hierarchical level is lowered, higher hierarchical levels of the images configuring the selection image, which are different from the lowest hierarchical level, are each associated with a sub-threshold distance longer than the threshold distance associated with a hierarchical level immediately lower than the higher hierarchical level and shorter than the threshold distance associated with the higher hierarchical level, and during the multiple hierarchical-levels display process, when the specified image is an image in one of the higher hierarchical levels, the display control section further executes a transparent display process of transparently displaying, in the display area, non-specified images which belong to the same hierarchical level as the one of the higher hierarchical levels and which are different from the specified image while the spatial distance detected by the distance detection section is equal to or longer than the sub-threshold distance associated with the one of the higher hierarchical levels, and hiding the non-specified images when the spatial distance detected by the distance detection section is shorter than the sub-threshold distance associated with the one of the higher hierarchical levels.

9. The display apparatus according to claim 8, further comprising a transmission acceptance section accepting selection of whether or not to allow the display control section to execute the transparent display process.

10. An electronic apparatus comprising:
a main body section of the electronic apparatus; and
the display apparatus according to claim 8.

11. An image forming apparatus comprising:
a main body section of the image forming apparatus; and
the display apparatus according to claim 8.

* * * * *